(12) United States Patent
Pasquetto

(10) Patent No.: US 6,865,788 B2
(45) Date of Patent: Mar. 15, 2005

(54) NUMERICAL-CONTROL MILLING MACHINE

(75) Inventor: Franco Pasquetto, Cadoneghe (IT)

(73) Assignee: O.M.V. Officine Meccaniche Venete S.r.l., S. Maria Di Sala (IT)

( * ) Notice: Subject to any disclaimer, the term of this patent is extended or adjusted under 35 U.S.C. 154(b) by 0 days.

(21) Appl. No.: 10/225,091

(22) Filed: Aug. 20, 2002

(65) Prior Publication Data

US 2003/0053875 A1 Mar. 20, 2003

(30) Foreign Application Priority Data

Aug. 21, 2001 (IT) ..................................... TO2001A0821

(51) Int. Cl.$^7$ .............................. B23Q 7/02; B23C 1/04; B23C 1/14; B23B 39/16
(52) U.S. Cl. ........................ 29/38 B; 29/38 A; 409/168; 409/192; 409/224; 409/237; 409/158; 269/57; 408/71; 408/43; 408/50
(58) Field of Search ................................ 409/168, 192, 409/203, 213, 217, 224, 237, 202, 212, 158; 269/57; 29/38 R, 38 A, 38 B; 408/71, 42–43, 50

(56) References Cited

U.S. PATENT DOCUMENTS

| | | | | | |
|---|---|---|---|---|---|
| 3,442,175 | A | * | 5/1969 | Heap et al. ................. | 409/203 |
| 3,456,557 | A | * | 7/1969 | Hautau ....................... | 409/203 |
| 3,587,390 | A | * | 6/1971 | Lohneis et al. ............. | 409/221 |
| 3,700,228 | A | * | 10/1972 | Peale ......................... | 269/57 |
| 3,998,127 | A | * | 12/1976 | Romeu ....................... | 409/224 |
| 4,369,958 | A | * | 1/1983 | Maynard .................... | 409/168 |
| 4,712,282 | A | * | 12/1987 | Romeu ....................... | 409/168 |
| 5,117,552 | A | * | 6/1992 | Babel ......................... | 409/235 |
| 5,172,464 | A | * | 12/1992 | Kitamura et al. .......... | 409/168 |
| 5,525,776 | A | * | 6/1996 | Okamoto ............... | 219/121.68 |
| 5,674,169 | A | * | 10/1997 | Yang .......................... | 483/32 |
| 5,678,291 | A | | 10/1997 | Braun | |
| 5,865,576 | A | * | 2/1999 | Arai et al. .................. | 409/224 |
| 5,919,011 | A | * | 7/1999 | Schweizer .................. | 409/131 |
| 6,185,802 | B1 | * | 2/2001 | Gruber et al. .............. | 29/38 B |
| 6,298,531 | B1 | * | 10/2001 | Baumbusch et al. ......... | 29/40 |
| 6,332,604 | B1 | * | 12/2001 | Chu ............................ | 269/71 |
| 6,394,892 | B2 | * | 5/2002 | Hanisch et al. ............ | 451/259 |
| 2002/0006764 | A1 | | 1/2002 | Hanisch et al. | |
| 2002/0009343 | A1 | * | 1/2002 | Uetake et al. .............. | 409/203 |
| 2003/0129035 | A1 | * | 7/2003 | Schworer et al. .......... | 409/168 |

FOREIGN PATENT DOCUMENTS

| | | | |
|---|---|---|---|
| DE | 4315839 A1 | * | 11/1994 |
| DE | 19527507 C1 | * | 7/1995 |
| DE | 010049810 A1 | * | 4/2002 |
| EP | 000985489 A2 | * | 3/2000 |
| EP | 0989923 | | 10/2001 |
| EP | 1216788 | | 6/2002 |
| JP | 59-142035 A | * | 8/1984 |
| JP | 2-279249 A | * | 11/1990 |
| JP | 2001-009653 | | 1/2001 |
| WO | WO-98/57777 A1 | * | 12/1998 |

OTHER PUBLICATIONS

Tool and Manufacturing Engineers Handbook, 4$^{th}$ ed., vol. 1, Machining, 1983, pp. 10–16 through 10–21.*

* cited by examiner

Primary Examiner—Erica Cadugan
(74) Attorney, Agent, or Firm—Sheridan Ross PC

(57) ABSTRACT

A numerical-control milling machine having a supporting frame; a worktable fitted to the supporting frame so as to oscillate about a substantially horizontal first axis of rotation, and in turn having two rotary platforms, each for accommodating a workpiece; and two independent work units, each of which is fitted movably to the supporting frame, alongside the worktable, is positioned facing a corresponding platform, and provides for machining the workpiece on the platform; the two work units selectively operating either asynchronously, to machine the workpieces fixed to the two platforms independently of each other, or synchronously to perform the same machining operations simultaneously on the workpieces fixed to the two platforms.

16 Claims, 6 Drawing Sheets

US 6,865,788 B2

NUMERICAL-CONTROL MILLING MACHINE

The present invention relates to a numerical-control milling machine.

More specifically, the present invention relates to a numerical-control, five-axis milling machine for producing gas-turbine blades, to which the following description refers purely by way of example.

BACKGROUND OF THE INVENTION

As is known, numerical-control milling machines currently used for producing gas-turbine blades comprise a supporting frame; a rocking worktable fixed to the supporting frame to oscillate about a horizontal axis of rotation over the worktable; and a work unit having a toolspindle movable in space to perform any desired milling operation.

The work unit normally comprises an upright fitted to the supporting frame to move in a horizontal direction parallel to the axis of rotation of the worktable; and a toolhead movable vertically, on command, along the upright, and which is normally equipped with an electrically operated horizontal spindle movable horizontally to and from the worktable in a direction parallel to its own axis of rotation.

The worktable normally comprises a rotary platform to which the work is fixed directly.

Milling machines of the above type also comprise a control unit for driving the various actuating devices on the machine to regulate in real time the tilt angle of the worktable, the angular position of the rotary platform, the position of the upright on the supporting frame, the position of the toolhead on the upright, and the position of the spindle with respect to the toolhead, so as to machine the work on the rotary platform fully automatically.

Milling machines of the above type have the major drawback of lacking versatility, and so only being used on a very small scale.

SUMMARY OF THE INVENTION

It is an object of the present invention to provide a numerical-control milling machine designed to eliminate the above drawbacks.

According to the present invention, there is provided a numerical-control milling machine comprising a supporting frame, and a worktable fitted to the supporting frame so as to oscillate about a substantially horizontal first axis of rotation; the milling machine being characterized in that said worktable comprises two platforms, each for accommodating a workpiece; and two independent work units, each of which is fitted movably to the supporting frame, alongside the worktable, is positioned facing a corresponding platform, and provides for machining the workpiece on the platform; the two work units selectively operating either asynchronously, to machine the workpieces fixed to the two platforms independently of each other, or synchronously to perform the same machining operations simultaneously on the workpieces fixed to the two platforms.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
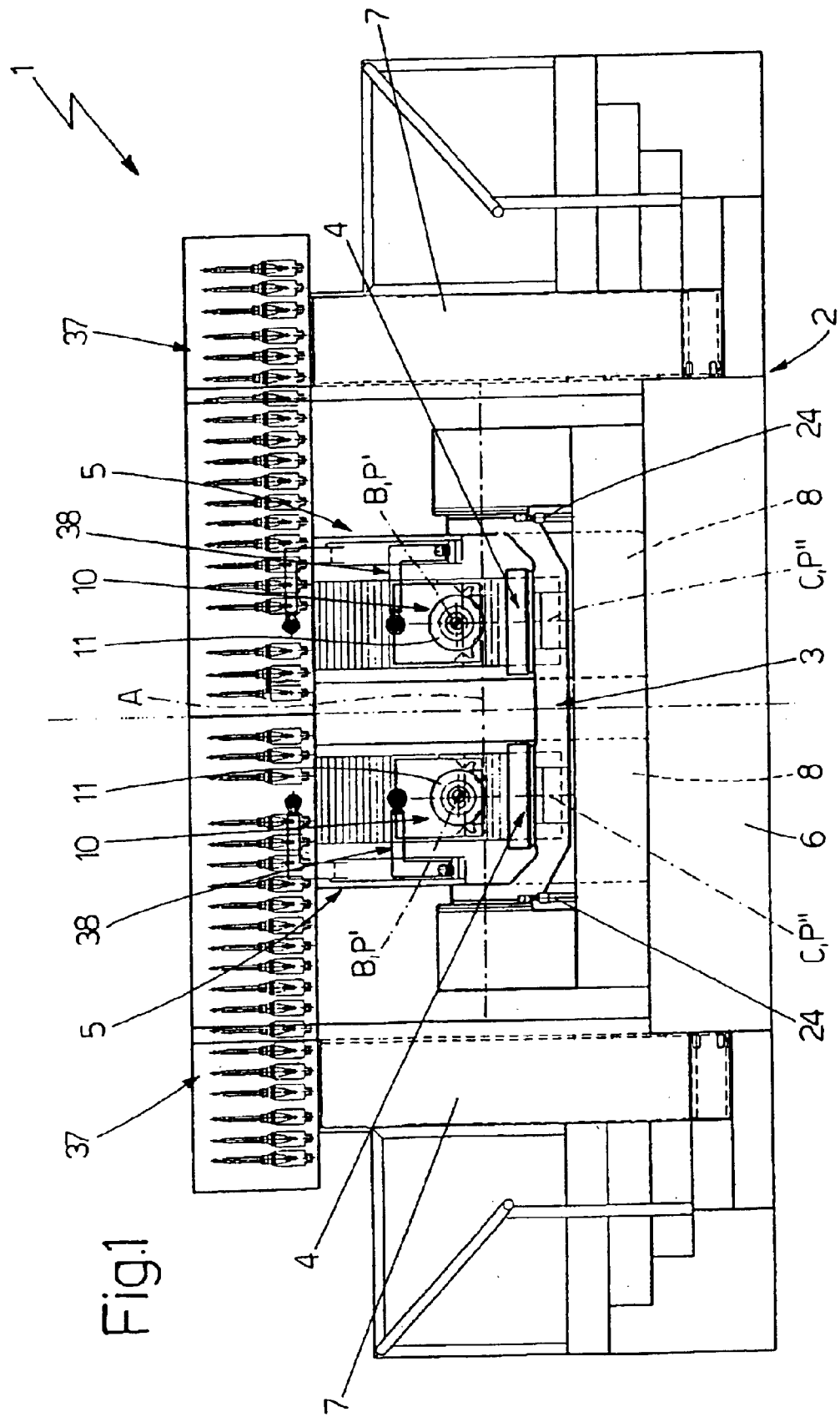
FIG. 1 shows a front view of a numerical-control milling machine in accordance with the teachings of the present invention.

With reference to FIGS. 1–4, number 1 indicates as a whole a numerical-control milling machine which may be used to advantage for producing the blades and/or bladed stages of any type of gas turbine, or any three-dimensional part of complex structure.

Milling machine 1 comprises: a supporting frame 2; a rocking worktable 3 having two rotary platforms 4, each for accommodating a respective workpiece; and two independent work units 5, each of which is positioned facing a respective rotary platform 4 of worktable 3, and provides for machining the workpiece on the corresponding rotary platform 4 as described in detail later on.

More specifically, worktable 3 is substantially U-shaped, and is fixed at both sides to supporting frame 2 to oscillate about a horizontal axis A of rotation located over the bottom of the worktable where the two rotary platforms 4 are positioned; and the two workpieces are positioned on rotary platforms 4 so that their centers of gravity lie, when possible, along axis A.

The two work units 5 are fitted to supporting frame 2, alongside worktable 3, so as to move on the frame in a direction parallel to axis A.

In the example shown, supporting frame 2 comprises a horizontal base 6, and a gantry 7 fixed to horizontal base 6, alongside worktable 3, so that the upper crosspiece extends parallel to axis A; and the two work units 5 are mounted to move in the gap just below gantry 7.

Figure 2:
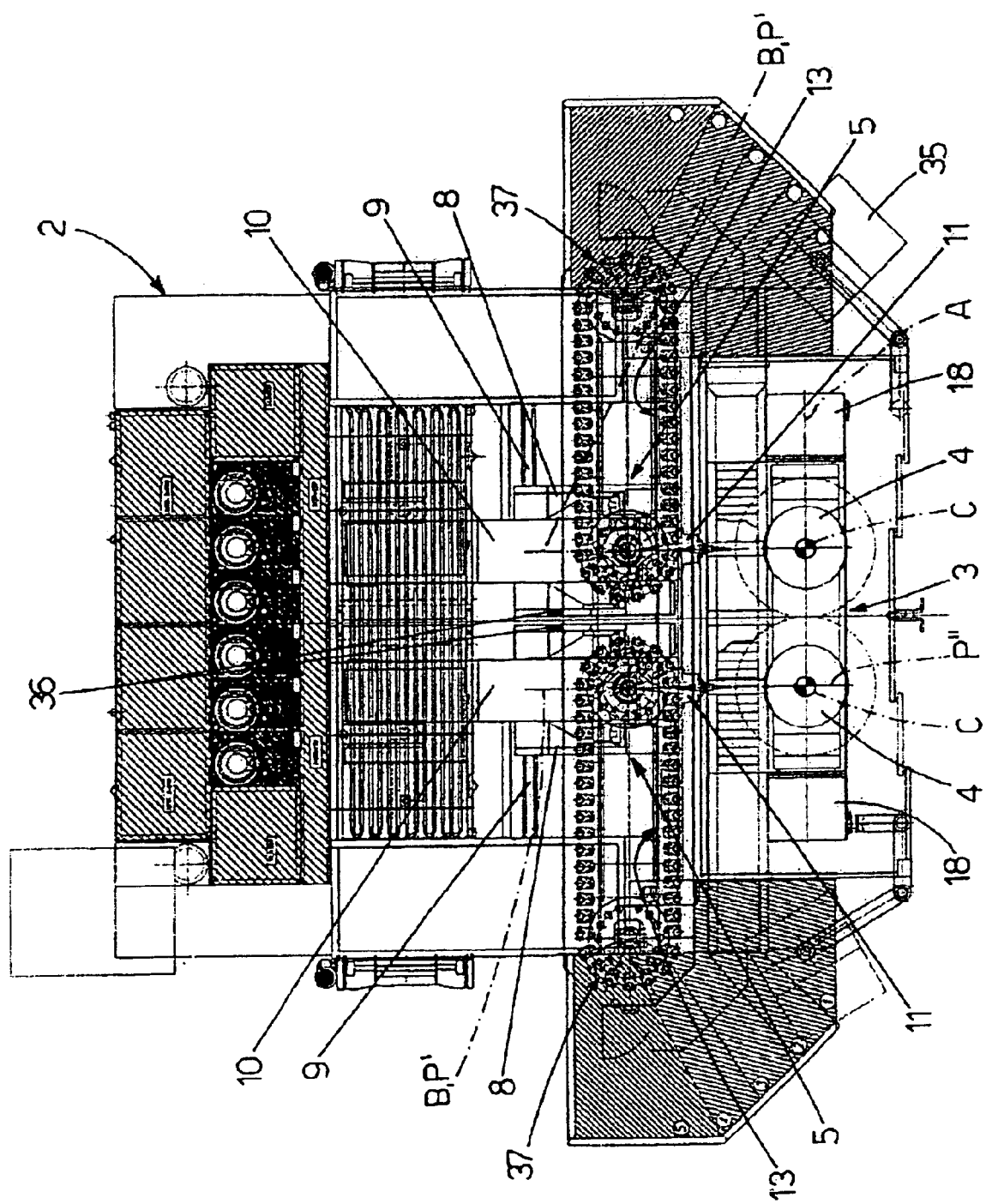
FIG. 2 shows a plan view, with parts removed for clarity, of the FIG. 1 milling machine.
Figure 3:
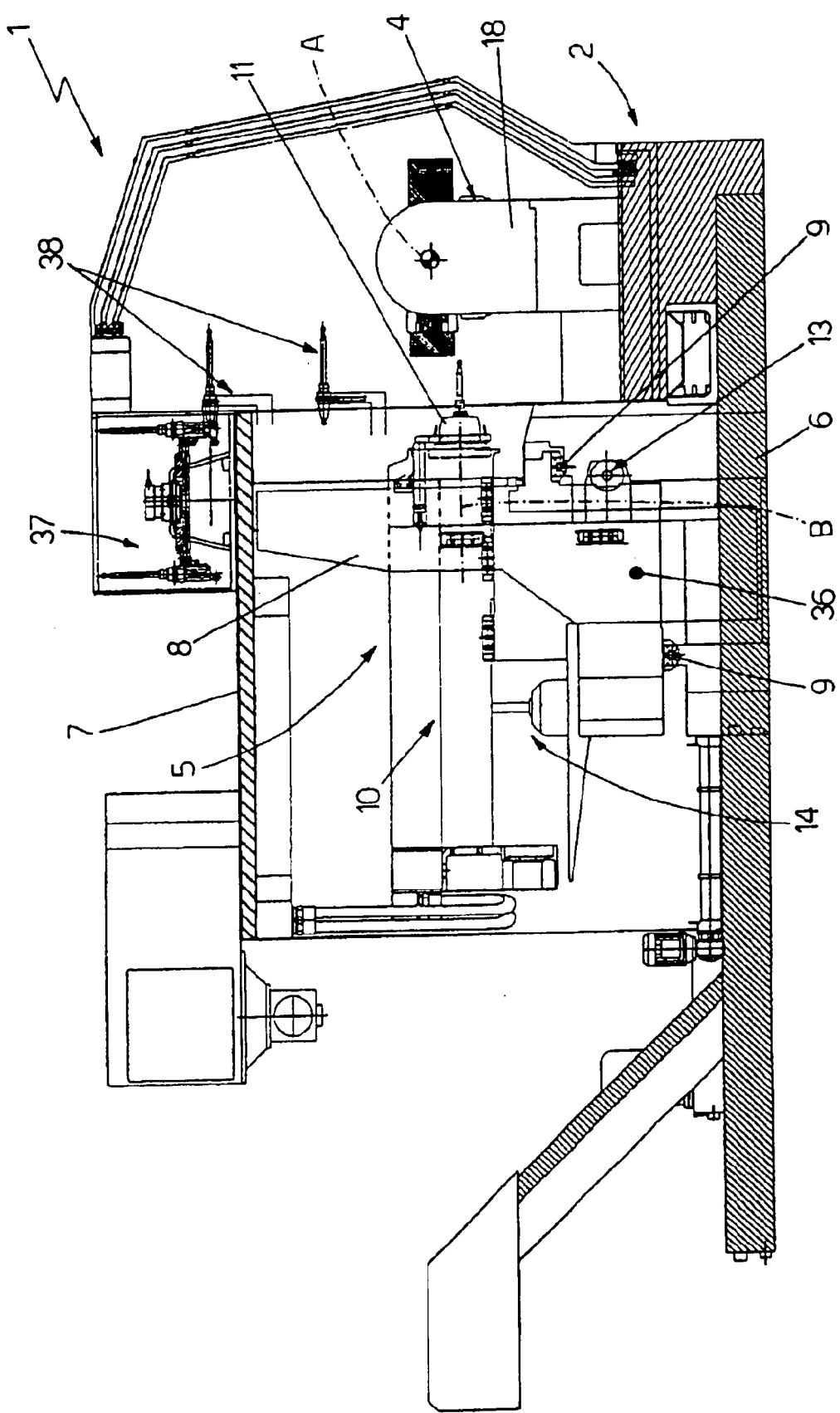
FIG. 3 shows a side view, with parts in section and parts removed for clarity, of the FIGS. 1–2 milling machine.

With reference to FIGS. 1, 2 and 3, the two work units 5 each comprise an upright 8 mounted to slide along horizontal rails 9 extending parallel to axis A on base 6; a toolhead 10 mounted to slide vertically on the body of upright 8; and an electric spindle 11 or any other type of motor-driven spindle (i.e. the assembly comprising a toolspindle and corresponding drive motor) fitted to toolhead 10 in a horizontal position with its toolspindle facing worktable 3.

More specifically, electric spindle 11 is fitted to toolhead 10 so that the axis of rotation of the toolspindle—hereinafter referred to as axis B—lies horizontally in a vertical plane P' perpendicular to axis A.

Toolhead 10 comprises actuating means (not shown) which, on command and in known manner, move electric spindle 11 in a horizontal direction parallel to axis B of rotation of the toolspindle, so as to regulate, instant by instant, the distance between worktable 3 and the tip of the tool fitted to the spindle.

In addition to the actuating means of electric spindle 11 in toolhead 10, each work unit 5 also comprises actuating means 13 which, on command, move upright 8 along horizontal rails 9 extending parallel to axis A on base 6; and actuating means 14 which, on command and in known manner, move toolhead 10 along upright 8.

More specifically, in the example shown, actuating means 13 of each upright 8 employ a ball screw system for moving the corresponding upright 8 along horizontal rails 9.

Figure 4:
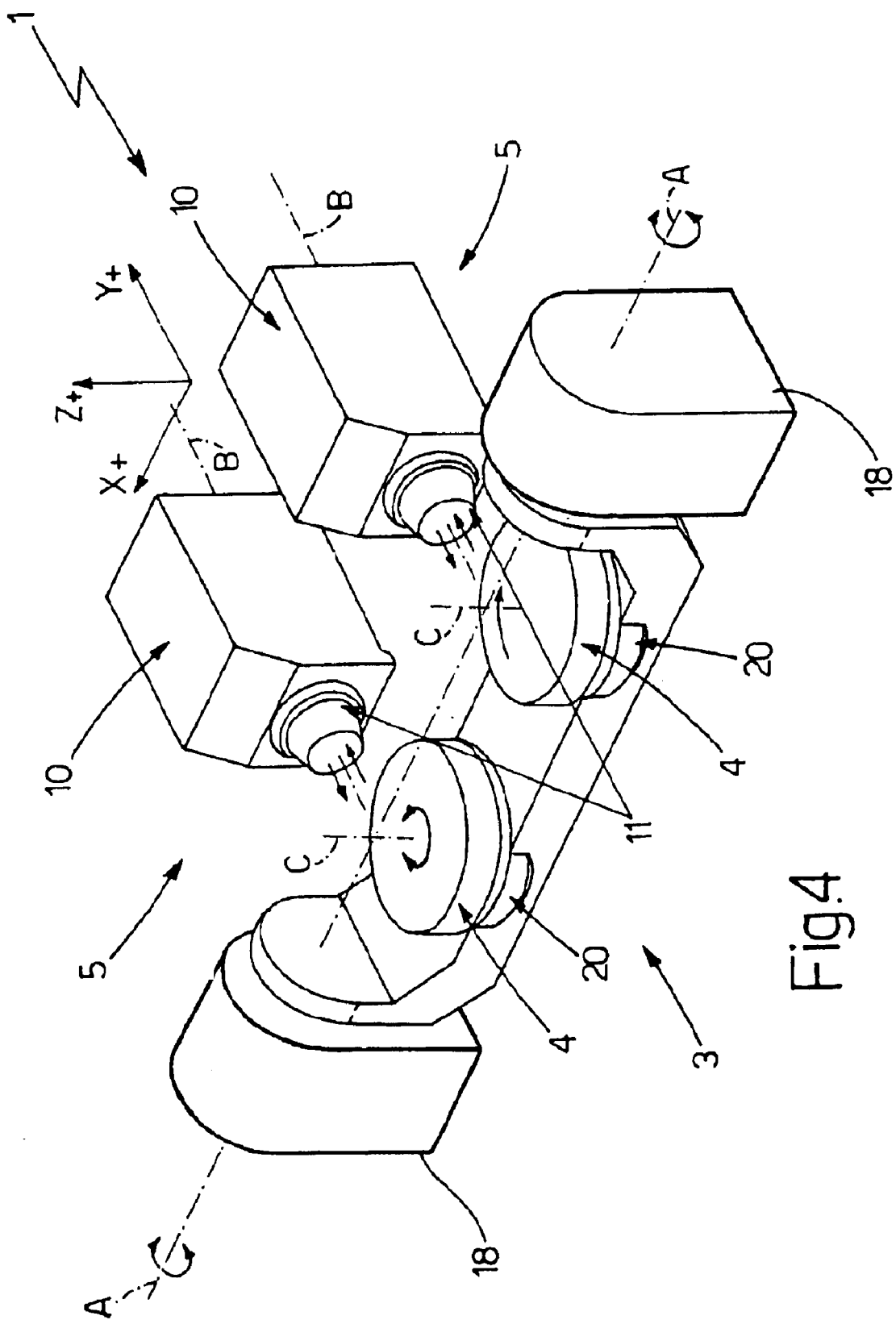
FIG. 4 shows a schematic view in perspective, with parts removed for clarity, of the FIGS. 1–3 milling machine.

In other words, with reference to FIG. 4, electric spindle 11 of each work unit 5 is movable in space along three Cartesian axes X, Y, Z, one of which (in the example shown, the X axis) is parallel to axis A.

The two rotary platforms 4 are located on the bottom of worktable 3, are aligned parallel to axis A, a given distance apart, and each rotates, independently of the other and with respect to the body of worktable 3, about a respective axis C of rotation perpendicular to axis A.

It should be pointed out that axes C of rotation of the two rotary platforms 4 are parallel to each other, and each lies at all times in a vertical plane P'' perpendicular to axis A, regardless of the tilt angle of worktable 3.

Figure 5:
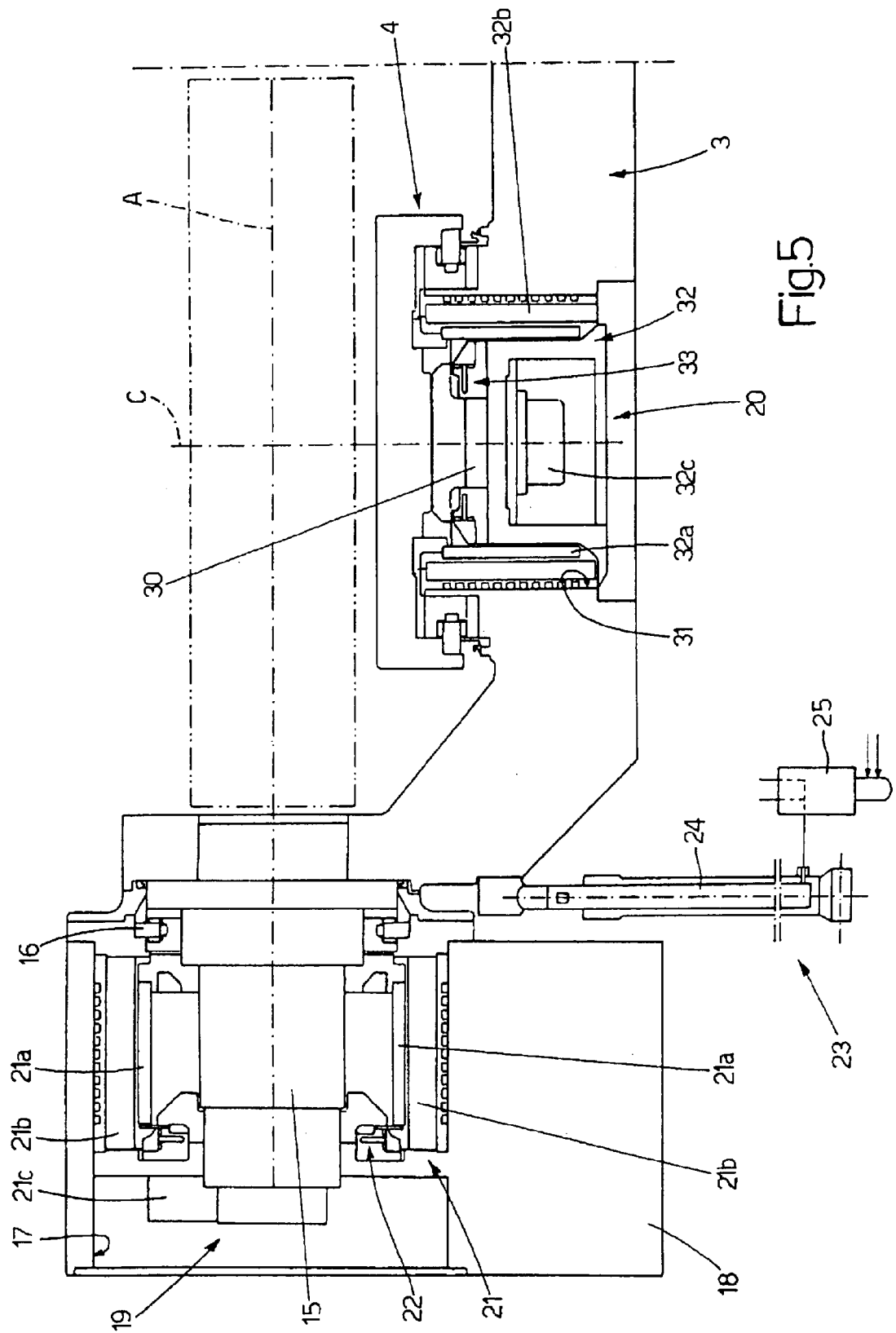
FIG. 5 shows a front view, with parts in section and parts removed for clarity, of a component part of the FIGS. 1–4 milling machine.

With particular reference to FIGS. 1 and 5, in the example shown, worktable 3 is substantially gondola- or cradle-shaped, and, at the two axial ends, has two cylindrical pins 15, each of which is mounted to rotate, via the interposition of rolling bearings 16, inside a seat 17 formed in the end of a corresponding supporting column 18 projecting vertically from base 6.

Milling machine 1 obviously also comprises actuating means 19 for operating worktable 3, and actuating means 20 for operating rotary platforms 4 the first for real-time controlling rotation of worktable 3 about axis A and, therefore, its tilt angle with respect to base 6, so as to prevent undesired twisting of worktable 3; and the second for real-time controlling rotation of each rotary platform 4 about respective axis C.

More specifically, in the example shown, actuating means 19 comprise two electric torque- and speed-control motors (so-called torque motors) 21, each connected directly to a respective cylindrical pin 15 of worktable 3 to rotate the whole worktable 3 about axis A on command; and two hydraulic braking devices 22 for selectively preventing rotation of the two cylindrical pins 15 about axis A.

More specifically, the two electric torque motors 21 and two braking devices 22 are housed in the two seats 17 formed in supporting columns 18, each fitted to a respective cylindrical pin 15 of worktable 3. In the example shown, the rotor 21a of each electric motor 21 is fitted directly to the corresponding cylindrical pin 15, while the stator 21b of each electric motor 21 is fixed to the column, inside seat 17, and coaxial with rotor 21a.

It should be pointed out that, in the example shown, the position sensor 21c (so-called encoder) of electric motor 21, which provides for determining instant by instant the angular position of rotor 21a with respect to stator 21b, is also used for determining the tilt angle of worktable 3 with respect to the vertical. Fitting electric motor 21 directly to cylindrical pin 15, i.e. with no gears in between, in fact, rules out any possibility of measuring error.

The two braking devices 22 comprise hydraulic jaws for selectively gripping the corresponding cylindrical pins 15 to prevent them rotating about axis A.

Preferably, though not necessarily, actuating means 19 governing the position of worktable 3 also comprise a balancing device 23 for balancing the weight of worktable 3 and compensating for the effects produced by the eccentricity, with respect to axis A, of the center of gravity of worktable 3 and any workpieces fixed to it.

More specifically, the weight force on the center of gravity of worktable 3 generates a torque which increases alongside an increase in the tilt angle of worktable 3 with respect to the vertical, and which tends to restore worktable 3 to a balanced position, i.e. aligned perfectly beneath axis A. Balancing device 23 provides for balancing this torque so that the twisting torque which the two electric motors 21 must apply to respective cylindrical pins 15 to rotate worktable 3 about axis A is substantially constant at all times, regardless of the angular position of worktable 3.

With reference to FIGS. 1 and 5, in the example shown, weight balancing device 23 is defined by two hydraulic pistons 24, each having a first end hinged to base 6, and a second end hinged to the body of worktable 3 eccentrically with respect to cylindrical pin 15; and by an electrically controlled hydraulic distributor 25, which regulates pressurized oil flow to and from the two hydraulic pistons 24 as a function of the angular position of worktable 3, so as to compensate for the effects produced by the eccentricity of the center of gravity of worktable 3 with respect to the axis A of rotation of the worktable.

To keep worktable 3 steady in a given position without weight balancing device 23, electric motors 21 would have to apply a twisting torque varying as a function of the tilt angle of worktable 3 with respect to the vertical.

As regards actuating means 20 of rotary platforms 4, each rotary platform 4, as shown in FIG. 5, is disk-shaped, and has a projecting central cylindrical pin 30 coaxial with axis C and housed for rotation inside a corresponding seat 31 formed in the body of worktable 3, and actuating means 20 are defined by two electric torque- and speed-control motors (so-called torque motors) 32, each fitted directly to cylindrical pin 30 of a respective rotary platform 30 to rotate rotary platform 4 about respective axis C on command, and by two hydraulic braking devices 33 for selectively preventing rotation of the two cylindrical pins 30 about respective axes C.

More specifically, the two electric torque motors 32 and two braking devices 33 are housed inside the two seats 31 in worktable 3, each fitted to cylindrical pin 30 of the corresponding rotary platform 4. In the example shown, the rotor 32a of each electric motor 31 is fitted directly to the corresponding cylindrical pin 30, while the stator 32b of each electric motor 32 is fixed to the body of worktable 3, inside corresponding seat 31, and is coaxial with rotor 32a.

Like electric motors 21, the position sensor 32c (i.e. encoder) of electric motor 32, which provides for determining instant by instant the angular position of rotor 32a with respect to stator 32b, is also used for determining the angular position of rotary platform 4, seeing as electric torque motor 32 is fitted directly to cylindrical pin 30.

Like braking devices 22, the two braking devices 33 each comprise hydraulic jaws for selectively gripping the corresponding cylindrical pin 30 to prevent respective rotary platform 4 from rotating about axis C.

With reference to FIG. 2, milling machine 1 also comprises a central control unit 35 for controlling actuating means 19 governing the position of worktable 3, actuating means 20 of the two rotary platforms 4, and the means governing the movement in space of electric spindle 11 of each of the two work units 5—i.e. actuating means 13 for moving each upright 8 on supporting frame 2 (X axis), actuating means 14 for moving each toolhead 10 on respective upright 8 (Z axis), and the actuating means for moving each electric spindle 11 on respective toolhead 10 (Y axis)— so as to simultaneously and fully automatically machine two separate workpieces, each fixed to a respective rotary platform 4.

More specifically, control unit 35 can control the various actuating means of milling machine 1 to machine the two workpieces on worktable 3 either synchronously—i.e. by the two work units 5 moving respective electric spindles 11 in space synchronously with each other—or asynchronously— i.e. by the two work units 5 moving respective electric spindles 11 in space fully independently of each other.

In the first case, the two finished parts are identical; whereas, in the second case, the two finished parts may be completely different.

More specifically, when the two work units 5 operate synchronously, control unit 35 appoints one work unit 5 as the main unit, assigns it direct control of all five machining axes of milling machine 1 (i.e. movements along the X, Y and Z axes, and rotations about axes A and B), and then controls the actuating means of rotary platforms 4 and the actuating means governing the movement in space of electric spindles 11 of the two work units 5, so that the movements of the second control unit 5 and corresponding rotary platform 4 faithfully reproduce the movements of the main work unit 5 and corresponding rotary platform 4.

Conversely, when the two work units 5 operate asynchronously, control unit 35 controls the various actuating means of milling machine 1, so that the two work units 5 operate fully independently with independent four-axis control.

In the example shown, control unit 35 disables movements of worktable 3 about axis A (one of the machining axes of the machine), and controls actuating means 20 of the two rotary platforms 4 and the means governing the movement in space of electric spindles 11 of the two work units 5 fully independently of one another, so that each work unit 5 directly controls movements along its four machining axes (i.e. movements along the X, Y and Z axes, and rotations about axis C).

In the example shown, control unit 35 can also temporarily suspend machining by either one of work units 5, to allow the other work unit 5 to perform any machining operations requiring use of the fifth machining axis of the machine, i.e. requiring rotation of the work about axis A.

In other words, the fifth machining axis of the machine, i.e. rotation of worktable 3 about axis A, is shared by both work units 5, and can be used when needed by either one of work units 5, by temporarily suspending machining by the other.

To safeguard against interference or collision of work units 5, in addition to the position sensors in actuating means 13 of each upright 8, milling machine 1, in the example shown, also comprises one or more sensors 36 for determining instant by instant the distance between uprights 8.

In which case, as a function of the signals from sensors 36, control unit 35 sequentially slows down the movements of the two uprights 8 along horizontal rails 9 extending on base 6, when the distance between the two work units 5 falls below a first given threshold value, and disables any movement of the two uprights 8 along horizontal rails 9, when the distance between the two work units 5 falls below a second given threshold value.

With particular reference to FIG. 2, milling machine 1, in the example shown, is equipped with a photocell or a laser distance sensor 36, which is located on the side of one of uprights 8, so as to directly face the other upright 8 and so determine in real time the actual distance between the sides of the two uprights 8.

With reference to FIGS. 1, 2 and 3, milling machine 1 also comprises two chain conveyor toolstores 37 aligned side by side on the top crosspiece of gantry 7, and each of the two work units 5 comprises an articulated arm 38 for performing the tool-change procedure fully automatically. More specifically, the articulated arm 38 of each work unit 5 is fitted movably to upright 8, and provides, in sequence, for removing the tool from the toolspindle of toolhead 10, depositing the tool in the toolstore 37 directly over upright 8, withdrawing a new tool from toolstore 37, and fitting the new tool to the toolspindle of toolhead 10.

Operation of milling machine 1 as described and illustrated herein is easily deducible, with no further explanation required.

The advantages of milling machine 1 as described and illustrated herein are obvious: by providing two independent work units 5 capable of operating both synchronously and asynchronously, structurally different bladed gas-turbine stages can be produced simultaneously, thus greatly improving the versatility of the machine.

Milling machine 1 as described and illustrated herein also has the further advantage of twice the hourly output of conventional milling machines, and much lower running costs than two conventional machines operating in parallel.

Another advantage of milling machine 1 described above lies in control unit 35 being able to complete machining even in the event of a fault on one of the two work units 5, by all the process control systems being duplicated to control the two work units 5 independently.

Clearly, changes may be made to milling machine 1 as described and illustrated herein without, however, departing from the scope of the present invention.

Figure 6:
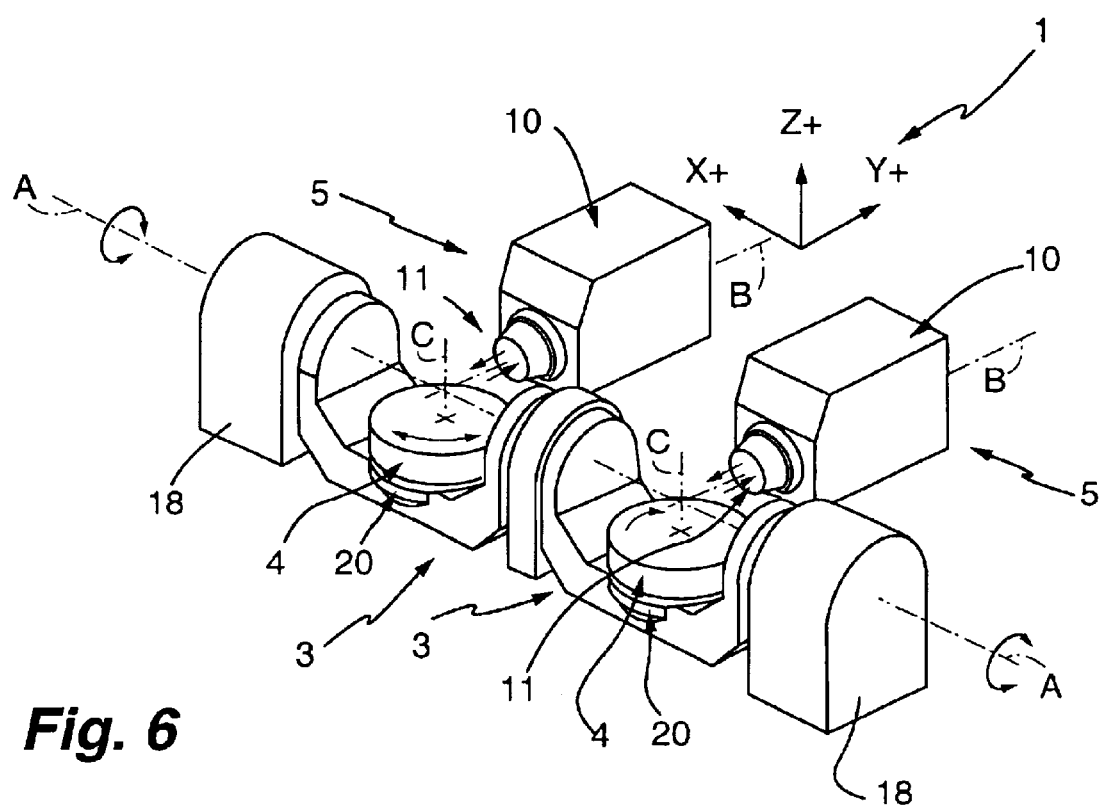
FIG. 6 shows a schematic view in perspective, with parts removed for clarity, of a milling machine having two worktables, each with one platform.

In particular, in a variation shown in FIG. 6, milling machine 1 may comprise two rocking worktables fitted to supporting frame 2 side by side and aligned along axis A. In which case, the two rocking worktables oscillate independently about axis A, and each have only one rotary platform 4.

In other words, as shown in FIG. 6, milling machine 1 comprises two rocking worktables aligned side by side along axis A, and which differ from worktable 3 solely by each having only one rotary platform 4, all the other structural characteristics being the same.

In this variation, worktable actuating means 19 are therefore duplicated to real-time control the tilt angle of each worktable with respect to base 6, and supporting frame 2 may comprise a third supporting column projecting from base 6, centrally between supporting columns 18, to support one end of both rocking worktables.

What is claimed is:

1. A numerical-control milling machine (1), comprising: a supporting frame (2), and a worktable (3) which is fitted to the supporting frame (2) so as to oscillate about a substantially horizontal first axis of rotation (A) and comprises at least two platforms (4) which are aligned side-by-side along the first axis of rotation, each for accommodating a workpiece; the milling machine (1) further comprising two independent work units (5), each of which is positioned facing a respective platform (4) of the worktable (3) with a toolspindle which is capable of rotating about a second axis of rotation (B) lying in a plane (P') substantially perpendicular to said first axis of rotation (A), each of said second axes being parallel to one another, the toolspindles movable in space along three cartesian axes (X, Y, Z) for machining the workpiece on the respective platform (4); the first axis of rotation (A) of the worktable (3) being parallel to a first axis (X) of said three cartesian axes (X, Y, Z); the toolspindles of the two work units (5) being movable in space along the three cartesian axes (X, Y, Z) fully independently one to the other and the milling machine (1) also comprising actuating means for governing the movement in space of the toolspindle of each of the two work units (5) so as to automatically machine two separate workpieces, each fixed to one of said respective platforms (4), and a central control unit (35) for controlling said actuating means so as to machine the two workpieces on the worktable (3) either synchronously by moving the two toolspindles in space synchronously one with each other, or asynchronously by moving the two toolspindles in space fully independently of one to the other.

2. The milling machine as claimed in claim 1, wherein said toolspindle rotates about a second axis of rotation (B) lying in a plane (P') substantially perpendicular to said first axis of rotation (A).

3. The milling machine as claimed in claim 2, wherein each work unit (5) comprises an upright (8) mounted to slide on the supporting frame (2) in a direction parallel to said first axis of rotation (A); a toolhead (10) mounted to slide vertically on a body of the upright (8); and a motor-driven spindle (11) fitted to the toolhead (10) with its toolspindle facing said worktable (3).

4. The milling machine as claimed in claim 3, wherein the toolspindle of said motor-driven spindle (11) is positioned horizontally, and is fitted movably to the corresponding toolhead (10) so as to translate in a horizontal direction parallel to said second axis of rotation (B).

5. The milling machine as claimed in claim 4, wherein said actuating means for governing the movement in space of the toolspindle of each of the two work units (5) comprises first actuating means (13) for moving the upright (8) along the supporting frame (2) on command; second actuating means for moving the toolhead (10) along the upright (8) on command; and third actuating means for moving the motor-driven spindle (11) on the toolhead (10) in said horizontal direction parallel to the second axis of rotation (B).

6. The milling machine as claimed in claim 1, wherein each said respective platform (4) is fitted to a body of said worktable (3) to rotate about a third axis of rotation (C) perpendicular to said first axis of rotation (A); said milling machine (1) also comprising fourth actuating means (20) for rotating, which, on command, rotate each said platform (4) independently about the respective third axis of rotation (C).

7. The milling machine as claimed in claim 1, further comprising fifth actuating means (19) for rotating, which, on command, rotate said worktable (3) about said first axis of rotation (A).

8. The milling machine as claimed in claim 7, wherein said worktable (3) is U-shaped and includes two ends, and comprises, at said two ends, two pins (15), each mounted for rotation in the supporting frame (2); said fifth actuating means (19) for rotating comprising at least one electric motor (21) fitted directly to a corresponding pin (15) of said worktable (3) so as to rotate, on command, the whole worktable (3) about the first axis of rotation (A).

9. The milling machine as claimed in claim 8, wherein said fifth actuating means (19) for rotating comprises a balancing device (23) for balancing a weight of the worktable (3), and which compensates for effects produced by an eccentricity, with respect to the first axis of rotation (A), of a center of gravity of the worktable (3) and any workpieces fixed to it, so that a twisting torque which said at least one electric motor (21) must apply to the pin (15) to rotate the worktable (3) about the first axis of rotation (A) is substantially constant at all times, regardless of an angular position of the worktable (3).

10. The milling machine as claimed in claim 7, wherein said fifth actuating means (19) for rotating comprises a balancing device (23) for balancing a weight of the worktable (3), and which compensates for effects produced by an eccentricity, with respect to the first axis of rotation (A), of a center of gravity of the worktable (3) and any workpieces fixed to it.

11. A numerical-control milling machine (1), comprising:
a supporting frame (2), and two worktables (3) which are aligned side by side along a horizontal first axis of rotation (A) and are fitted to the supporting frame (2) so as to oscillate about said first axis of rotation (A); each of said two worktables (3) comprising a respective platform (4) for accommodating a workpiece; the milling machine (1) further comprising two independent work units (5), each of which is positioned facing one of said respective platforms (4) and is provided with a toolspindle which is movable in space along three cartesian axes (X, Y, Z) for machining the workpiece on the respective platform (4); the first axis of rotation (A) of the two worktables (3) being parallel to a first axis (X) of said three cartesian axes (X, Y, Z); the toolspindles of said two work units (5) being movable in space along the three cartesian axes (X, Y, Z) fully independently one to the other and the milling machine (1) also comprising actuating means fat governing the movement in space of the toolspindle of each of the two work units (5) so as to automatically machine two separate workpieces, each fixed to one of said respective platforms (4), and a central control unit (35) for controlling said actuating means so as to machine the two workpieces on the two worktables (3) either synchronously by moving the two toolspindles in space synchronously one with each other, or asynchronously by moving the two toolspindles in space fully independently one to the other; each of said two work units (5) further comprising an upright (8) mounted to slide on the supporting frame (2) in a direction parallel to said first axis of rotation (A), a toolhead (10) mounted to slide vertically on the body of the upright (8), and a motor-driven spindle (11) fitted to the toolhead (10) with its toolspindle facing said worktable (3); each of said toolspindles being positioned horizontally and being capable of rotating about a second axis of rotation (B) lying in a plane (P') substantially perpendicular to said first axis of rotation (A).

12. The milling machine as claimed in claim 11, wherein said actuating means for governing the movement in space of the toolspindle of each of the two work units (5) comprises first actuating means (13) for moving the upright (8) along the supporting frame (2) on command; second actuating means for moving the toolhead (10) along the upright (8) on command; and third actuating means for moving the motor-driven spindle (11) on the toolhead (10) in said horizontal direction parallel to the second axis of rotation (B).

13. The milling machine as claimed in claim 11, wherein each of said respective platforms (4) is fitted to a body of a corresponding one of said two worktables (3) to rotate about a third axis of rotation (C) perpendicular to said first axis of rotation (A); said milling machine (1) also comprising fourth actuating means (20) for rotating, which, on command, rotate said respective platforms (4) independently about the respective third axis of rotation (C).

14. The milling machine as claimed in claim 11, further comprising fifth actuating means (19) for rotating, which, on command, rotate each of the two worktables (3) about said first axis of rotation (A).

15. The milling machine as claimed in claim 11, wherein each said toolspindle of said motor-driven spindle (11) is fitted movably to the corresponding toolhead (10) so as to translate in a horizontal direction parallel to said second axis of rotation (B).

16. The milling machine as claimed in claim 11, wherein said upright (8) of each of said two work units (5) are located side-by-side to one another.

* * * * *